(12) United States Patent
Mirebeau et al.

(10) Patent No.: US 7,332,671 B2
(45) Date of Patent: Feb. 19, 2008

(54) CONNECTION ARRANGEMENT FOR SUPERCONDUCTOR CABLE SHIELDS

(75) Inventors: Pierre Mirebeau, Villebon S/Yvette (FR); Klaus Schippl, Hannover (DE); Frank Schmidt, Langenhagen (DE); Nicolas Lallouet, La barriere du Bois (FR)

(73) Assignee: Nexans (FR)

( * ) Notice: Subject to any disclaimer, the term of this patent is extended or adjusted under 35 U.S.C. 154(b) by 247 days.

(21) Appl. No.: 11/292,418

(22) Filed: Nov. 30, 2005

(65) Prior Publication Data

US 2008/0007374 A1    Jan. 10, 2008

(30) Foreign Application Priority Data

Dec. 1, 2004   (FR) .................................. 04 52827

(51) Int. Cl.
*H01B 12/00*   (2006.01)
(52) U.S. Cl. ..................................... 174/15.5; 174/15.4
(58) Field of Classification Search ...... 174/15.4–15.5, 174/125.1; 505/884–887, 898; 335/216
See application file for complete search history.

(56) References Cited

U.S. PATENT DOCUMENTS 7,148,423 B2 *  12/2006  Masuda et al. .......... 174/125.1
7,166,804 B2 *  1/2007   Yumura et al. .......... 174/125.1
7,265,297 B2 *  9/2007   Ashibe et al. ........... 174/125.1

FOREIGN PATENT DOCUMENTS

WO    0229930    4/2002

OTHER PUBLICATIONS

French Search Report- Jun. 15, 2005.

* cited by examiner

*Primary Examiner*—Ramon M. Barrera
(74) *Attorney, Agent, or Firm*—Sofer & Haran, LLP (57) ABSTRACT

A connection arrangement for electrically interconnecting the shields of so-called "cold-dielectric" superconductor cables in the context of a muiltiphase superconductive electrical link, each super-conductor cable comprising a central superconductor presenting superconductivity at cryogenic temperature, electrical insulation surrounding the central conductor, a shield surrounding the electrical insulation, and a cryostat surrounding said shield. According to the invention, the arrangement comprises a superconductive link between said shields, said superconductive link comprising a link superconductor and a cryogenic sheath surrounding said link superconductor, each of the two ends of said link superconductor being connected to a respective one of said shields by connection means that are both electrically and thermally conductive. The invention is particularly applicable to high voltage electricity.

19 Claims, 6 Drawing Sheets

Fig.6

CONNECTION ARRANGEMENT FOR SUPERCONDUCTOR CABLE SHIELDS

RELATED APPLICATION

This application is related to and claims the benefit of priority from French Patent Application No. 04 52827, filed on Dec. 1, 2004, the entirety of which is incorporated herein by reference.

FIELD OF THE INVENTION

The present invention relates to a connection arrangement for cold-dielectric superconductor cable shields, in particular the shields of superconductor cables for different phases.

BACKGROUND OF THE INVENTION

Transporting electricity by means of high voltage superconductor cables enables high currents to be transported while using cable sections that are much smaller than is possible with conventional cables made of resistive electrical conductors, while simultaneously limiting electrical losses along the cable, in particular losses due to the Joule effect, since that phenomenon is extremely weak with superconductivity. In order to reduce losses, electricity is transported in multiphase alternating current (AC) form, generally three-phase AC, with one phase cable being dedicated to each of the phases (so with three-phase AC, there are three separate phase cables).

A "cold-dielectric" superconductor phase cable is constituted by a central electrical conductor constituted at least by: a superconductive portion (referred to below as the "central superconductor"), electrical insulation surrounding said superconductor (referred to below as the "dielectric"), a shield surrounding said dielectric, which shield may be constituted in full or in part by superconductors, and a cryogenic enclosure or "cryostat" surrounding said shield. Said cryostat is generally constituted by two concentric coverings that are thermally insulated from each other (by a vacuum at $10^{-5}$ millibars (mbars), for example). A cryogenic fluid contained inside the inner covering of the cryostat cools the central superconductor through the dielectric (whence the term "cold dielectric) down to the temperature at which the superconductor is in a superconductive state (with this temperature being of the order of −196° C., for example, for so-called "high temperature" super-conductors).

For safety reasons, the presence of a shield in a cable is mandatory once the voltage applied to the cable reaches a certain value (e.g. 1 kilovolt (kV) in France). These shields are connected to a ground potential, generally to earth. This avoids any risk of electrocution in the event of coming accidentally into contact with the cable, e.g. because a person is digging in the ground in which an electric cable is buried.

With cold-dielectric superconductor cables, currents of similar magnitudes are caused to flow both in the central superconductor and in the shield (particularly if the shield is constituted in full or in part by a super-conductor). For high-voltage cables, the magnitude of this current can be high (e.g. 2400 amps (A)) and it is therefore not possible to envisage connecting the shield directly to the earth. The solution consists in interconnecting the shields of the phase cables. The resulting current is the vector sum of the phase currents, so the magnitude of the resulting current is zero or nearly zero and it can therefore be connected to the earth.

For three-phase AC, two cables suffice to interconnect the shields of all three phases, and a resistive cable (e.g. a copper cable) is generally used for making the connection to the earth after vector canceling of the currents. Nevertheless, interconnecting the shields by a resistive cable leads to thermal and electrical loses by the Joule effect, and thus to an increase in the quantity of cryogenic fluid consumed for cooling the superconductor, and leads to a drop in the electrical efficiency of the installation as a whole. Furthermore, if thermal losses are too great, the rise in temperature around the resistive link can prevent the cryogenic fluid from being effective in cooling the superconductor in the vicinity. The superconductive portions can then switch from a superconductive state to a state of ordinary conductivity, thereby worsening the drop in the electrical efficiency of the installation.

OBJECTS AND SUMMARY OF THE INVENTION

The present invention solves this technical problem, and to do so it provides a connection arrangement for the shields of superconductor phase cables, each cable comprising a central superconductor, a dielectric surrounding said central superconductor, a shield surrounding said dielectric, and a cryostat surrounding said shield, said cryostat being capable of containing a cryogenic fluid. The arrangement comprises a link super-conductor cable between said shields, said link cable comprising a link superconductor and a cryogenic sheath surrounding said link superconductor, each of the two ends of said link superconductor being connected to a respective one of said shields by connection means that are electrically and thermally conductive.

In an embodiment, the link superconductor comprises an electrically and thermally conductive support having superconductor strands wound thereabout. These super-conductor strands may be in the form of tapes or wires (e.g. $Bi_2Sr_2Ca_2Cu_3O$ type superconductor tapes). Said connection means are in thermal contact with said cryogenic fluid and they are thermally and electrically connected to said support, said superconductor strands being cooled by thermal conduction along said connection means and said support. The support is made of a metal that is a good conductor both electrically and thermally, e.g. copper, and it may be in the form of a solid bar, a tube, or a metal cable (such as a cable of enameled copper wires, for example).

Advantageously, said cryogenic sheath may be connected to the cryostat by means of a "Johnston" type coupling, for example, which can provide sealing between the content of said cryogenic sheath and the content of said cryostat.

Said connection means may be provided with means for passing said cryogenic fluid between said cryostat and the inside of said sheath, said link superconductor then being cooled, at least in part, by contact with said cryogenic fluid.

Said connection means advantageously comprise a connection piece connected firstly to the end of said link superconductor and secondly to said shield. The connection piece may be connected to said shield via a flexible connection (e.g. a set of metal braids), or using an intermediate piece, which may be connected firstly to said shield via a sliding electrical contact (such as multicontact blades), and secondly is secured to said connection piece.

In another embodiment, said shield is surrounded by a conductor junction element, said shield and said junction element being electrically interconnected, said shield being connected to said connection means via said junction element. Said intermediate piece may be connected to said junction element by means of a sliding contact, e.g. constituted by metal blades interposed between said junction element and said intermediate piece.

Said junction element may be formed by a tube whose inside wall is secured to the outside wall of said shield, advantageously by soldering or brazing using an alloy having a low melting temperature.

BRIEF DESCRIPTION OF THE DRAWINGS

Other advantages and characteristics of the invention appear from the following description of several embodiments of the invention given as non-limiting examples, and with reference to the accompanying drawings, in which.

MORE DETAILED DESCRIPTION

Figure 1:
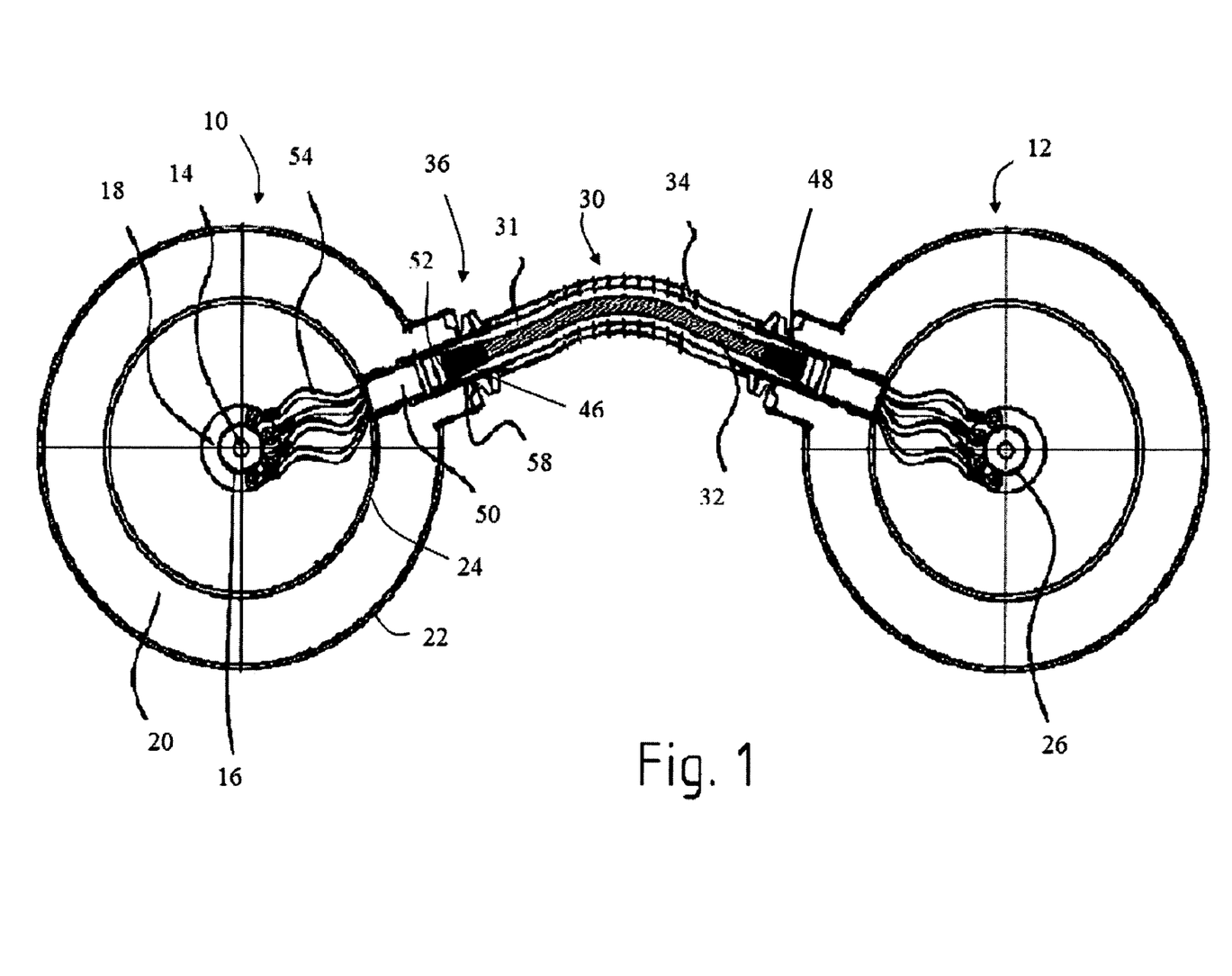
FIG. 1 is a section view showing two super-conductor phase cables and the connection arrangement for the shields of these two cables.

In FIG. 1, two phase cables 10 and 12 are identical, each comprising a central superconductor 14 surrounded by a dielectric, itself surrounded by a shield 16 constituted by materials that are electrically and thermally conductive or superconductive, e.g. a cable made up of a layer of copper tapes and a layer of super-conductive tapes. The dielectric is constituted by an insulating material that is selected and dimensioned to be capable of withstanding the electric field defined by the superconductor cable so as to avoid breakdown between the shield (at a potential of zero volts (V)), and the central superconductor (at high voltage). By way of example, the dielectric may be constituted by a plurality of layers of polypropylene based paper known as polypropylene laminated paper or PPLP.

A junction element 18 surrounds the shield 16 over a small fraction of the length of the shield to which it is connected both electrically and thermally. The junction element 18 may be in the form of a tube or a ring having its inside wall directly soldered or brazed to the outside surface of the shield 16. The junction element is made of a material that is a good conductor of electricity, e.g. copper. The soldering or brazing is preferably implemented using alloys having a low melting temperature.

A cryogenic enclosure or cryostat 20 of annular shape and constituted by an outer wall 22 and an inner wall 24 surrounds the junction element. A cryogenic fluid, e.g. liquid nitrogen, can flow inside the inner wall so as to cool the phase superconductor 14. Thermal insulation is provided between the inner wall 22 and the outer wall 24 (e.g. by a $10^{-5}$ mbar vacuum) to avoid heating the cryogenic fluid and consuming large amounts of said fluid.

The arrangement for interconnecting the shields 16 and 26 of the two superconductor phase cables, respectively 10 and 12, comprises a link superconductor cable 30, this cable being constituted by a link super-conductor 32 surrounded by a cryogenic sheath 34, preferably constituted by two concentric coverings that are thermally insulated from each other (e.g. by means of a vacuum), and by means 36 for connecting the link super-conductor 32 to the shield 16 or 26.

The connections between the link superconductor cable 30 and the shields 16 and 26 are identical, so only the connection between the shield 16 and the link cable 30 is described (left-hand portion of FIG. 1).

Figure 6:
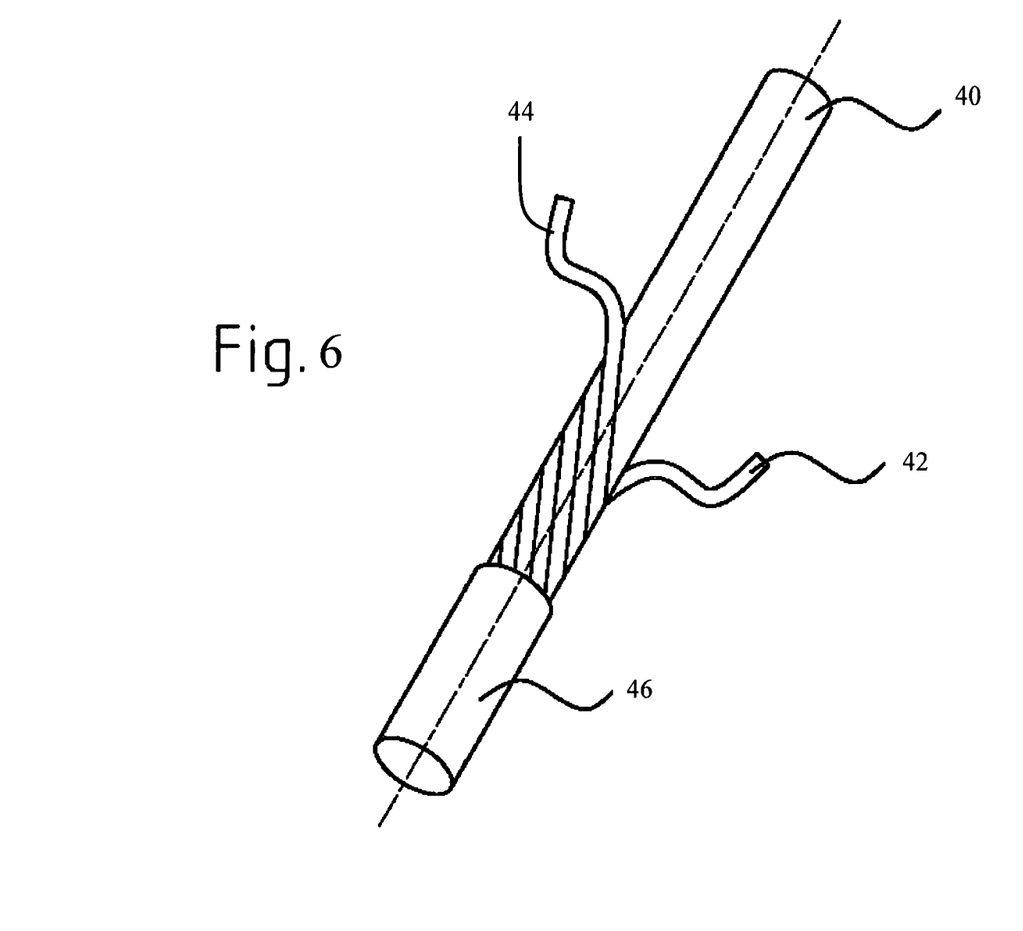
FIG. 6 is a perspective view of a portion of the link superconductor.

The superconductor 32 is constituted by a mechanical support 40 (see FIG. 6) having wound thereon one or more layers of superconductor strands 42 and 44 in the form of tapes or wires. One or more additional layers 46 in the form of carbon black or a dielectric material may optionally surround the layer(s) of superconductor tapes 42 and 44. The mechanical support 40 is made of a conductive material, e.g. copper, so as to pass electrical current in the event of the tapes 42 and 44 switching from a superconductive state to a state in which they are merely conductive. The support 40 may be a cable or it may be a rigid tube or a flexible tube. Layers of different kinds, of carbon black or of stainless steel tape or of paper, for example, may be inserted between the layers of superconductor tapes 42 and 44. These layers may serve respectively to smooth the potential over the outside diameter of the layer of superconductor tapes, to provide better protection and mechanical strength to the superconductor tapes, or to provide electrical insulation between the link super-conductor and the cryogenic sheath 34 over all or part of its length. The superconductor tapes 42 and 44 are soldered or brazed at both ends 46 and 48 (FIG. 1) to the support 40.

The connection means 36 comprise a connection piece 50 (FIG. 1) secured to the end 46 of the link super-conductor 32. This connection piece is made out of a block of a material that is a good conductor of heat and electricity, e.g. copper. The connection piece 50 is secured to the end 46 of the link superconductor 32 by soldering or brazing 52 (FIGS. 1 and 2) at a temperature that is compatible with the superconductor tapes 42 and 44. The soldering or brazing of the connection piece may be performed independently of the soldering or brazing of the superconductor tapes 42 and 44 to the two ends 46 and 48 of the support 40.

The connection means 36 also comprise a flexible connection 54 (FIGS. 1 and 2) electrically connecting the connection piece 50 to the junction element 18. The flexible connection 54 is made up of a plurality of metal braids, soldered firstly to the connection piece 50 and secondly secured mechanically and electrically by terminal lugs 56 to the junction element 18. The number of braids and their sections are selected as a function of the maximum current to be transported.

Each of the two ends of the cryogenic sheath 34 is fastened to the cryostat of a respective one of the phase cables. This fastening must ensure continuity of thermal insulation between the cryogenic sheath and the cryostat so as to avoid heating the cryogenic fluid. This type of fastening can be implemented using a coupling 58, advantageously of the Johnston type that is well known to the person skilled in the art. This type of coupling comprises a male portion and a female portion that engage mutually, the cryogenic sheath 34 can be secured to the male portion of the Johnston coupling by soldering, for example, while the female portion of the coupling is soldered between the inside wall 24 and the outside wall 22 of the cryostat of the phase cable. Such couplings are sold by the supplier Nexans, for example, for making cryogenic transfer lines.

The fastening of the connection piece 50 to the cryostat 20 can be implemented in two different ways depending on the method of cooling selected for the link superconductor 32.

In a first embodiment, cooling is provided by thermal conduction along the connection piece 50 and the support 40 of the link superconductor 32. The cryogenic fluid contained in the cryostat 20 does not pass into the cryogenic sheath 34. It is then necessary to provide sealing between the cryostat 20 and the sheath 34. This sealing may be made by clamping the connection piece 50 against the inside wall 24 of the cryostat 20, or by clamping between the male and female portions of the coupling 58.

In a second embodiment, the link superconductor 32 is cooled by direct contact with the cryogenic fluid of the cryostat 20. Under such circumstances, the connection part 50 does not need to be fastened in leaktight manner and passages may be provided through said connection piece so as to allow the cryogenic fluid of the cryostat 20 to pass into the space 31 between the cryogenic sheath 34 and the link superconductor 32.

In this second embodiment, it may be observed that the link superconductor 32 is also cooled in part by thermal conduction. This makes it possible, particularly if the flow rate of cryogenic fluid through the connection piece 50 is limited, to supplement the direct cooling by convection of the cryogenic fluid against the link superconductor with the thermal conduction along the support 40 and the connection means 36.

Figure 2:
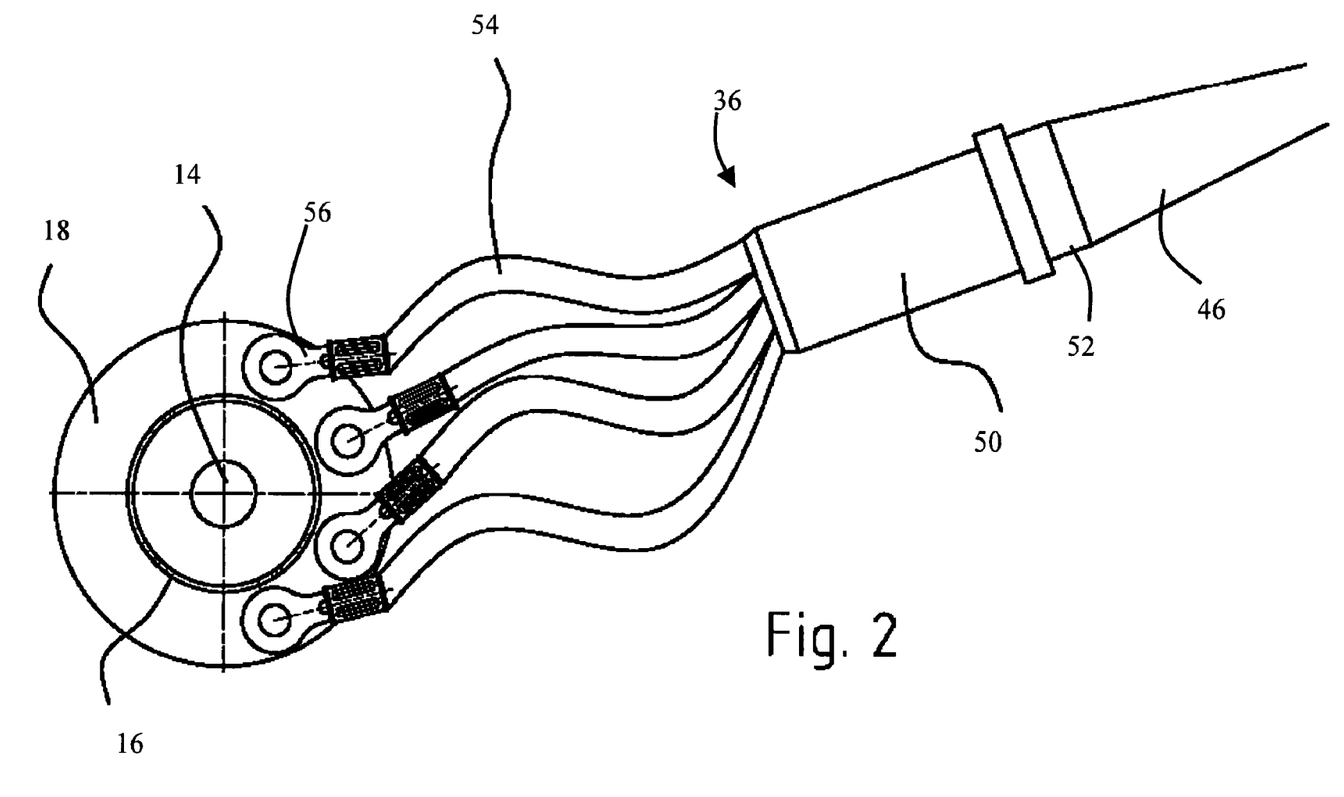
FIGS. 2, 3, 4, and 5 show various embodiments of the connection between the link superconductor and the shield of a superconductor phase cable.
Figure 3:
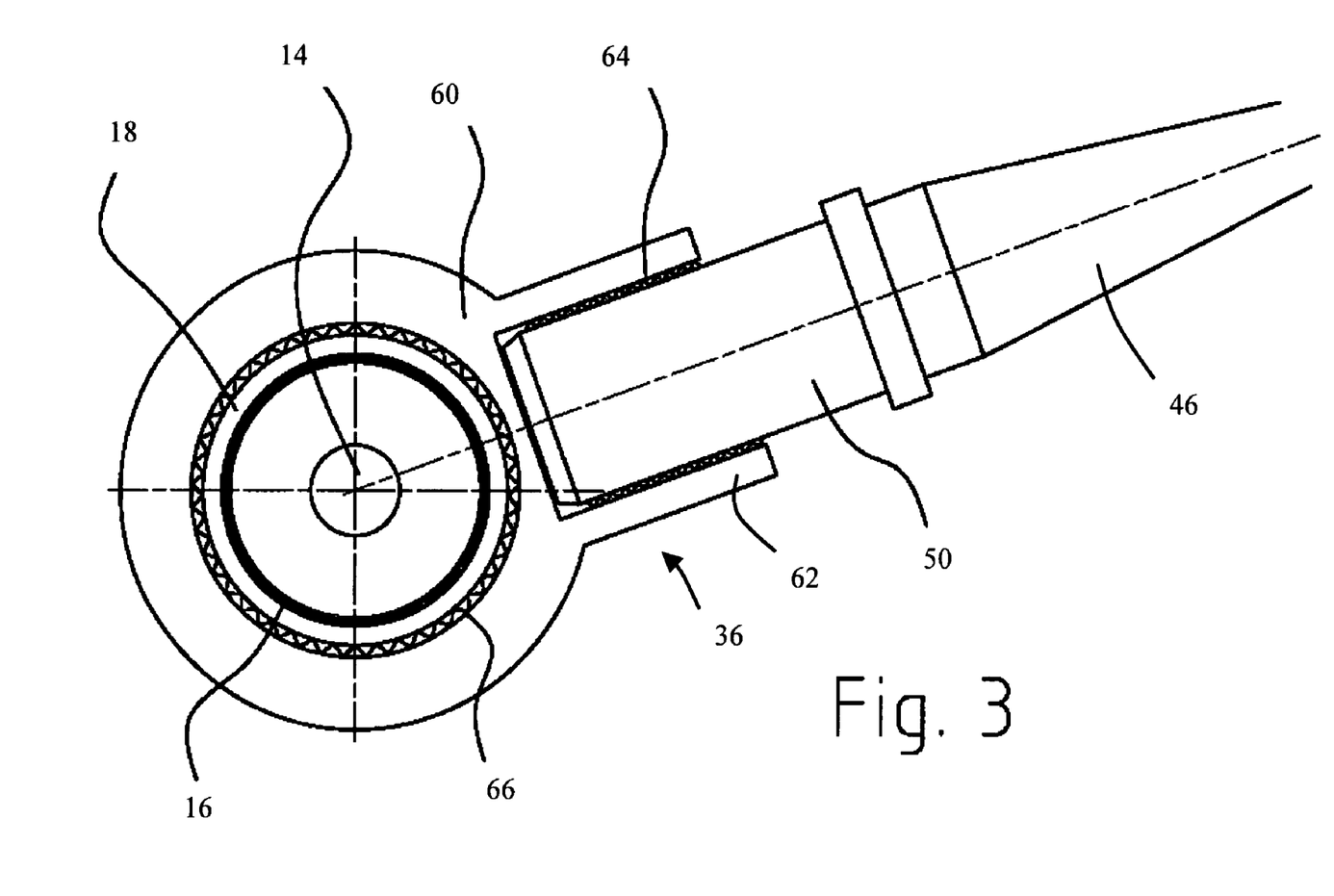
Figure 4:
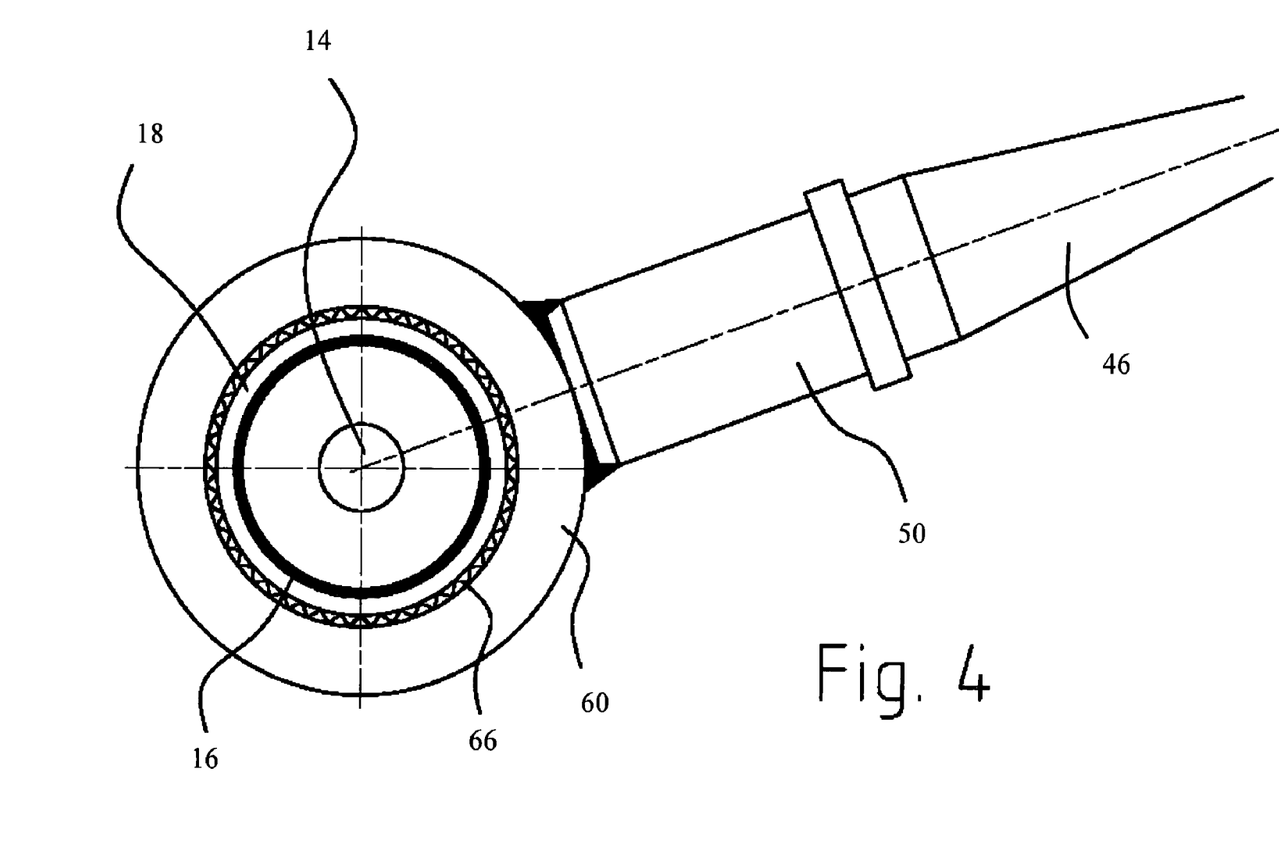

The various ways in which the connection piece 50 is connected to the junction element 18, as described with reference to FIGS. 1, 2, 3, and 4, all enable the thermal shrinkage or displacement of the cable to be accommodated. In FIGS. 3 and 4, thermal shrinkage of the cable is accommodated at the connection by contact blades 66 (multicontact blades) placed between the two concentric parts 18 and 60, these two parts sliding relative to each other, with electrical contact being maintained by the blades which always remain in contact with both parts 18 and 60. In FIGS. 1 and 2, there are no contact blades, but electrical connection during thermal shrinkage is maintained by the braids 54 moving. The parts 16, 18, and 14 move together along the axis of the cable, but the braids 54, which are provided in extra length, allow said movement to take place and electrical connection is maintained. The embodiments shown in FIGS. 1, 2, 3, and 4, which all allow thermal shrinkage of the cable or displacement thereof to be accommodated, are particularly well adapted to the circumstance in which the portion of the phase superconductor 10 constituted by the central superconductor 14, the dielectric, and the shield 16 is capable of moving (in particular while the installation is being cooled down by injecting cryogenic fluid, because of the shrinkage of thermal origin that is generated along the entire length of these three mechanically-interconnected elements).

In FIG. 3, the connection means 36 comprise the connection piece 50 and an intermediate piece 60 in the form of a ring or a cylinder provided with a coupling 62 of tubular shape. The connection piece 50 penetrates into the coupling 62, thus establishing electrical connection between the connection piece 50 and the intermediate piece 60. Advantageously, the coupling 62 is provided with a sliding electrical contact 64 made up of a set of electrically conductive contact blades, thus making it easy to connect and disconnect the connection piece 50 and the intermediate piece 60. Contact blades of this type, e.g. as sold by the supplier Multicontact, are well known to the person to the person skilled in the art. Another sliding electrical contact 66, advantageously via metal contact blades, is incorporated between the intermediate piece 60 and the junction element 18. Since the junction element 18 is secured to the shield (by brazing or soldering), the assembly formed by said element 18, the shield 16, and the phase super-conductor 14 can slide in the intermediate part 60. The sliding contact 66 thus conserves the electrical connection in the event of movement of the phase super-conductor portion 10 constituted by the central super-conductor 14, the dielectric, and the shield 16. The sliding metal contact blades 66 are preferably secured to the intermediate piece 60. The lengths of the junction element 18 and of the intermediate piece 60 are preferably identical and selected as a function of the expected thermal shrinkage.

The embodiment shown in FIG. 4 is simpler than that of FIG. 3. The intermediate piece 60 no longer has a coupling 62, but is secured directly to the connection piece 50, e.g. by soldering or brazing. The intermediate piece 60 and the connection piece 50 could be constituted by a single machined piece.

Figure 5:
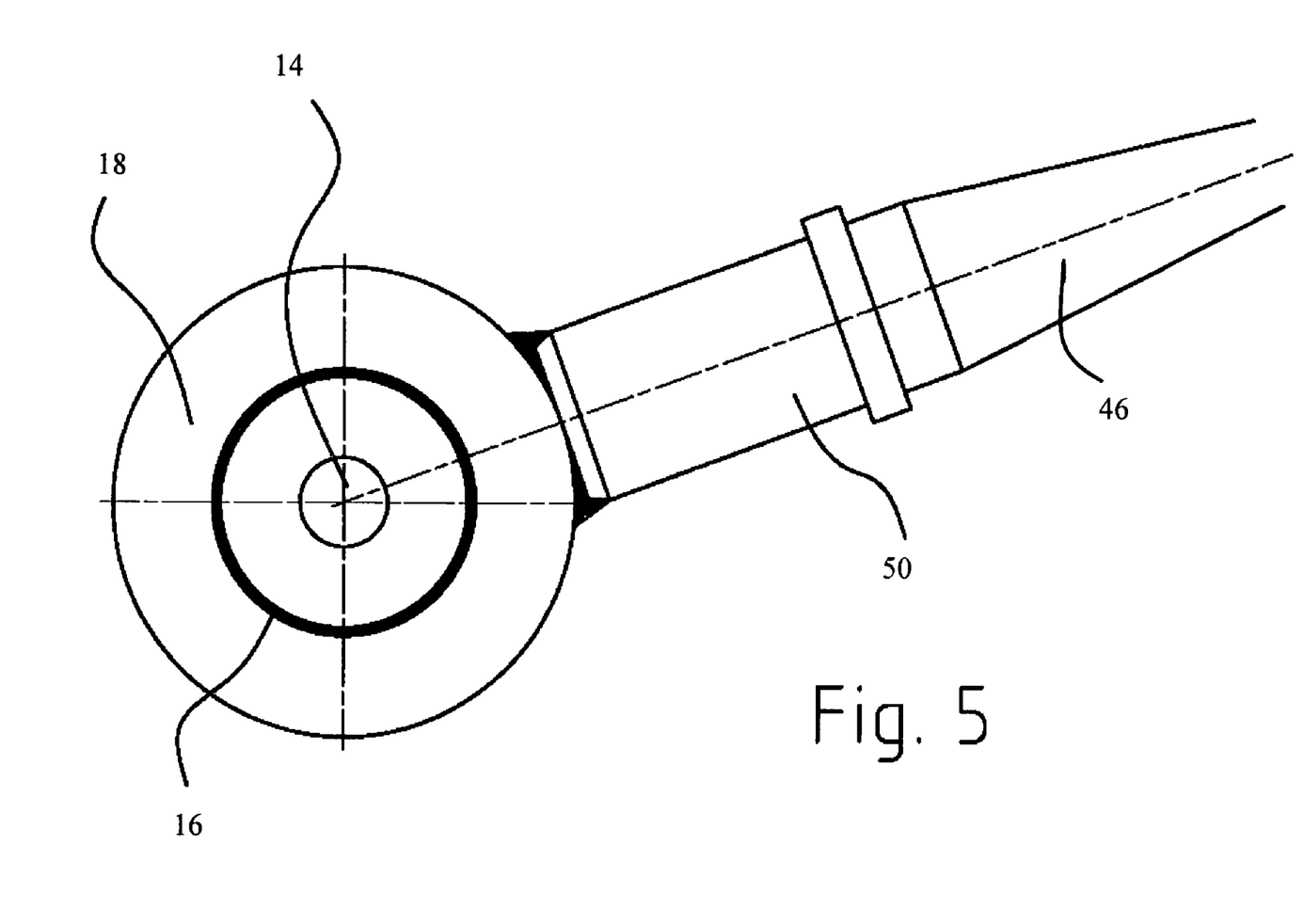

When the phase superconductor 14 is not likely to move, or when the amount of thermal shrinkage is small (e.g. for a short length of superconductor phase cable), the connection between the connection piece 50 and the junction element 18 can be stationary, as shown in FIG. 5. The connection piece 50 is then secured directly by soldering or brazing to the junction element 18. The junction element 18 may be secured to the shield 16, e.g. by soldering, brazing, or mechanical clamping. The connection piece 50 and the junction element 18 may form a single machined piece. Alternatively, this rigid connection between the piece 50 and the element 18 may be replaced by a removable connection, e.g. having a sliding contact, as in the embodiment of FIG. 3, so as to make it easy for the superconductive link cable to be installed and removed.

Several embodiments of the present invention are described above, however the invention is not limited to interconnecting the shields of only two superconductor phase cables. The shields of all of the phases can be interconnected by being connected in series. For example, for three-phase AC, the shield of phase No. 1 is connected to the shield of phase No. 2, which is connected to the shield of phase No. 3.

Naturally, the invention is not limited to the embodiments described and variants can be applied thereto within the competence of the person skilled in the art.

What is claimed is:

1. A connection arrangement for the shields of superconductor phase cables, each cable comprising a central superconductor, a dielectric surrounding said central superconductor, a shield surrounding said dielectric, and a cryostat surrounding said shield, said cryostat being capable of containing a cryogenic fluid, said arrangement comprising:
a link superconductor cable between said shields, said link cable having a link superconductor and a cryogenic sheath surrounding said link superconductor, each of the two ends of said link superconductor being connected to a respective one of said shields by connection means that are electrically and thermally conductive.

2. A connection arrangement according to claim 1, wherein said link superconductor has an electrically and thermally conductive support having superconductor strands wound thereabout, and wherein said connection means are in thermal contact with said cryogenic fluid and are thermally and electrically connected to said support, said superconductor strands being cooled by thermal conduction along said connection means and said support.

3. A connection arrangement according to claim 2, wherein said support is made of a metal that is a good conductor, both electrically and thermally.

4. A connection arrangement according to claim 1, wherein said connection means are provided with means for passing said cryogenic fluid between said cryostat and the inside of said sheath, said link superconductor being cooled, at least in part, by contact with said cryogenic fluid.

5. A connection arrangement according to claim 1, wherein said connection means includes a connection piece connected firstly to the end of said link superconductor, and secondly to said shield.

6. A connection arrangement according to claim 5, wherein said connection piece is connected to said shield via a flexible connection.

7. A connection arrangement according to claim 6, wherein said flexible connection is made by a set of metal braids.

8. A connection arrangement according to claim 5, wherein said connection piece is connected to said shield via an intermediate piece.

9. A connection arrangement according to claim 8, wherein said intermediate piece is connected to said shield via a sliding electrical contact.

10. A connection arrangement according to claim 9, wherein said sliding contact is constituted by metal blades interposed between said connection piece and said intermediate piece.

11. A connection arrangement according to claim 8, wherein said intermediate piece is secured to said connection piece.

12. A connection arrangement according to claim 1, wherein said shield is surrounded by a conductive junction element, said shield and said junction element being electrically interconnected, said shield being connected to said connection means via said junction element.

13. A connection arrangement according to claim 8, wherein said shield is surrounded by a conductive junction element, said shield and said junction element being electrically interconnected, said shield being connected to said connection means via said junction element, and wherein said intermediate piece is connected to said junction element via a sliding contact.

14. A connection arrangement according to claim 13, wherein said sliding contact is constituted by metal blades interposed between said junction element and said intermediate piece.

15. A connection arrangement according to claim 12, wherein said junction element is fastened by brazing or soldering to said connection piece.

16. A connection arrangement according to claim 12, wherein said junction element is formed by a tube whose inside wall is secured to the outside wall of said shield.

17. A connection arrangement according to claim 16, wherein said junction element is secured to said shield by soldering or brazing using a low-melting temperature alloy.

18. A connection arrangement according to claim 1, wherein said cryogenic sheath is connected to said cryostat via a leaktight coupling.

19. A connection arrangement according to claim 18, wherein said leaktight coupling is a "Johnston" type coupling.

* * * * *